Aug. 16, 1932.   G. I. JERALDS   1,872,461
GARMENT SUPPORTER LOOP
Filed April 11, 1932
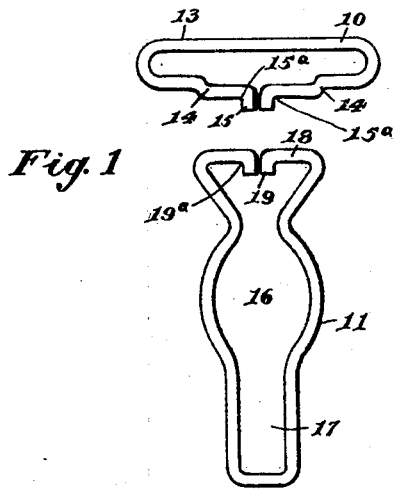
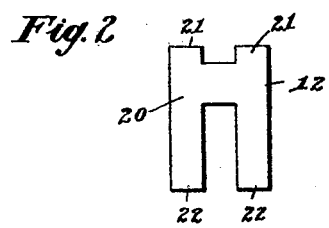
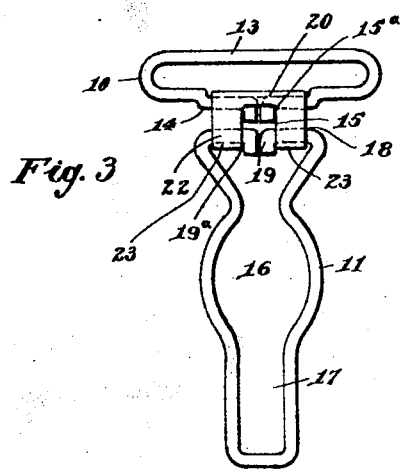
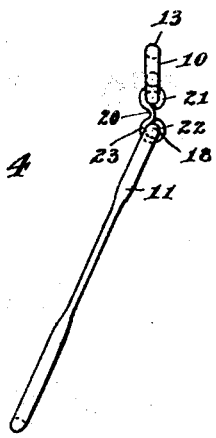
INVENTOR.
George I. Jeralds
BY
Christian M. Newman
ATTORNEY Patented Aug. 16, 1932

1,872,461

UNITED STATES PATENT OFFICE

GEORGE I. JERALDS, OF CHESHIRE, CONNECTICUT, ASSIGNOR TO THE BALL & SOCKET MANUFACTURING COMPANY, OF WEST CHESHIRE, CONNECTICUT, A CORPORATION OF CONNECTICUT

GARMENT SUPPORTER LOOP

Application filed April 11, 1932. Serial No. 604,437.

This invention relates to improvements in hose supporter loops, such as are adapted for use on hose supporters, over-alls, and the like.

This class of hose supporter loops are usually formed of wire and comprise a button-loop member, a web-loop member, and a ferrule member, which are hingedly connected together so that the button-loop member is permitted to swing with reference to the ferrule, better to permit the button-loop to be readily fastened to a button.

In the manufacture of hose supporter loops of this class, it is generally the case, in the formation of both the button-loop and the web-loop, to return the ends of the wire inward, in alignment, and to cover the aligned end portions with the associated ferrule. For a time, this practice was satisfactory, but with present day use of button loops of this class, it is found that the ends of one or the other of the loops is apt to pull out of the ferrule, due to the excessive strain which the loop in many instances is subjected to.

While I am aware that means have been provided for preventing either the ends of the web-loop or the ends of the button-loop from pulling out, yet in no instance has specific means been employed to prevent the ends of both loops from pulling out of a single connecting ferrule, and at the same time mounting the lower loop in a manner to allow it to swivel. It will be obvious that to provide means for preventing one or the other loop from pulling out is but a very slight improvement upon no means at all, since with the anchoring of the ends of one loop, we find that the ends of the other loop are more apt to loosen than if both ends were free.

It is therefore the object of my invention to provide a hose supporter loop of the general type heretofore referred to, including a web-loop, a button-loop, and a ferrule member for uniting the two loops, and whereby the button-loop member is hingedly supported in the ferrule, and wherein the ends of both loops are upset, deflected, swedged, or otherwise provided with holding means that will prevent the loop from spreading and its end portions from pulling out of the sockets of the ferrule.

With these and other objects in view, the invention resides and consists in the construction and novel combination and arrangement of parts hereinafter more fully described, illustrated in the accompanying drawing, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawing forming a part of this specification and upon which Fig. 1 shows a front elevation of a web-loop member and a button-loop member in spaced relation for assembling, and for the attachment of the ferrule;

Fig. 2 is a plan view of a sheet metal blank from which the ferrule for hingedly connecting the two loops together is formed;

Fig. 3 shows a front elevation of the assembled hose supporter loop ready for attachment to a web, not shown; and Fig. 4 shows an edge view of the hose supporter loop shown in Fig. 3, except that the button-loop member is shown in a forwardly swung position with respect to the ferrule.

Referring in detail to the characters of reference marked upon the drawing, 10 represents the web loop or top member of the button-loop, 11 the lower elongated loop, and 12 the blank from which the ferrule is formed. The first mentioned loop may obviously be of any preferred design, though where used for hose supporter or suspender purposes, it is usually of elongated shape forming a straight upper unbroken bar portion 13 of the intermediate portion of the length of wire, and a lower bar portion that is formed of the end members of the wire blank, and is provided with offsets to form shoulders 14— 14 against which the outer edges of the ferrule engage. The free ends of the wire of the lower bar portion are deflected outward to one side, as shown at 15, to form a sharp corner 15ª on their inside radius to flatly engage against the inner edges of sleeves.

The lower or button-loop portion includes a widened central portion 16, a narrower restricted portion 17 into which the shank of a button along with the fabric is drawn, when fastened. The upper portion which is formed of the end members 18 of the wire blank are disposed inward parallel, and like the end members of the web-loop, have their free ends 19 disposed to one side to form a sharp shoulder 19ª on their underside to firmly engage the inner ends of the short sleeves of the ferrule. When the parts are assembled, see Fig. 3, the four ends of the two loops will all be disposed downward and in close relation to the ends of the ferrule, and whereby the two straight bearing portions 18 are formed of each of the end members of the lower loop so that each portion may be separately encircled by separate members of the ferrule blank in a manner to be free to turn therein. With the wire ends all bent down in this manner, and a strain of pulling them apart exerted on the outside corners of the web-loop, the action is to lock the ends of the web-loop wire more firmly in the ferrule.

The blank shown in Fig. 2 is substantially in the form of a letter H. It includes a main body portion 20 that serves to cover the inner or top portion of the web-loop member, and which, together with the two short extensions 21—21, are closed down firmly against the sides of the aligned end portions of the upper loop, to attach the ferrule thereto against turning. The two longer extensions 22—22 serve to cover the front side of said parallel end portions of the web-loop and extend down and are each rolled around the separate end portion 18 of the button-loop, so as to form two separate spaced-apart aligned sleeves or sockets 23 in which the said end portions 18 of the button-loop are hingedly supported. This hinge action is very essential for it allows the combined loop and link to take the contour of anything it rests on, and saves it from considerable destructive possibilities, as when the parts are made rigid; if the garter happens to be stepped on or bent, it opens up the ferrule and destroys the loop.

This construction obviously provides four shoulders in each upper and lower portion of the ferrule to engage the shoulder portions of the three sleeves in which the wire ends are positioned, the inner shoulder on each wire end serving to engage the inner edge of the sleeves in a way to prevent them from pulling out, in accordance with the object of the invention. The construction is such as is practical to manufacture to advantage since the ends of the loops can readily be deflected when the loops are formed, so that the further operation of assembling by attaching the ferrule insures the completion of the article.

Having thus described my invention, what I claim and desire to secure by Letters Patent is:

1. In a garment supporter loop of the class described, a ferrule member including a relatively long upper sleeve portion and two integral aligned spaced-apart relatively short lower sleeves, a web-loop having aligned end portions and ends that are turned down and secured within the longer sleeve, a button-loop having aligned end members, one of which is hingedly supported in one of the shorter sleeves and the other similarly supported in the other sleeve, each of the last mentioned end members having their ends turned down to prevent their withdrawal from the sleeves of the ferrule.

2. In a garment supporter loop of the class described, a web-loop having aligned end portions whose ends are turned down to form shoulders, a button-loop having aligned end portions and ends that are turned down to form shoulders, a ferrule member forming a relatively long sleeve portion enclosing the entire top side of the end portions of the web-loop and open on its underside to accommodate the downwardly turned ends of the aligned portions of said web-loop, said ferrule member also including two integral aligned spaced-apart relatively short lower sleeves which encircle the aligned end portions of the button-loop in a manner to be engaged by their turned down ends, all of the said turned down end portions of the two said loops being for the purpose of preventing the withdrawal of said end portions from the sleeves in which they are supported.

Signed at West Cheshire, in the county of New Haven and State of Connecticut, this 7th day of April, A. D. 1932.

GEORGE I. JERALDS.